United States Patent
Wichmann et al.

(10) Patent No.: US 9,169,630 B2
(45) Date of Patent: Oct. 27, 2015

(54) COVER ELEMENT

(71) Applicant: ACO Severin Ahlmann GmbH & Co. KG, Budelsdorf (DE)

(72) Inventors: Thorsten Wichmann, Schonberg (DE); Arne Meincke, Osdorf (DE); Jan Mieze, Hamburg (DE)

(73) Assignee: ACO Severin Ahlmann GmbH & Co. KG, Budelsdorf (DE)

( * ) Notice: Subject to any disclaimer, the term of this patent is extended or adjusted under 35 U.S.C. 154(b) by 0 days.

(21) Appl. No.: 14/373,713

(22) PCT Filed: Jan. 23, 2013

(86) PCT No.: PCT/EP2013/051202
§ 371 (c)(1),
(2) Date: Jul. 22, 2014

(87) PCT Pub. No.: WO2013/110637
PCT Pub. Date: Aug. 1, 2013

(65) Prior Publication Data
US 2015/0017384 A1    Jan. 15, 2015

(30) Foreign Application Priority Data
Jan. 24, 2012  (DE) .......................... 10 2012 100 555

(51) Int. Cl.
*E03F 5/04* (2006.01)
*E03F 1/00* (2006.01)

(52) U.S. Cl.
CPC ............... *E03F 5/0401* (2013.01); *E03F 1/005* (2013.01); *Y10T 428/24149* (2015.01); *Y10T 428/24165* (2015.01); *Y10T 428/24273* (2015.01)

(58) Field of Classification Search
CPC ................................ E03F 1/005; E03F 5/0401
See application file for complete search history.

(56) References Cited

U.S. PATENT DOCUMENTS

| | | | | |
|---|---|---|---|---|
| 4,454,039 A | * | 6/1984 | McCoy | .......................... 210/164 |
| 2007/0217866 A1 | * | 9/2007 | Oscar | .............................. 405/36 |
| 2009/0279953 A1 | | 11/2009 | Allard et al. | |

FOREIGN PATENT DOCUMENTS

| | | |
|---|---|---|
| CA | 1158568 A1 | 12/1983 |
| CN | 2039717 U | 6/1989 |
| DE | 1708616 B | 11/1971 |
| DE | 10 2008 005 197 A1 | 7/2009 |
| EP | 0481937 A1 | 4/1992 |

(Continued)

OTHER PUBLICATIONS

English translation of Written Opinion for PCT Application No. PCT/EP2013/051202, dated Jul. 29, 2014, 10 pages.

(Continued)

*Primary Examiner* — Benjamin Fiorello
(74) *Attorney, Agent, or Firm* — Westman, Champlin & Koehler, P.A.

(57) ABSTRACT

The invention concerns a cover element for covering an opening in an in particular horizontal surface of a drainage body, with an edge region which is configured to support the cover element on the drainage body, and with a cover region which has a grid-like or perforated structure with supporting elements. It is distinguished in that the supporting elements have a thickness increasing in the vertical direction starting from the edge region in the direction of the regions remote from the edge, such that the cover element has a substantially plano-convex outer contour.

11 Claims, 2 Drawing Sheets

(56) References Cited

FOREIGN PATENT DOCUMENTS

| EP | 1416099 | A2 | 5/2004 |
|---|---|---|---|
| EP | 1416099 | A3 | 5/2004 |
| FR | 2917384 | A1 | 12/2008 |
| JP | 2006-249753 | A | 9/2006 |
| WO | 2007/141035 | A1 | 12/2007 |
| WO | 2011/042415 | A1 | 4/2011 |

OTHER PUBLICATIONS

International Search Report and Written Opinion for PCT Application No. PCT/EP2013/51202, dated Mar. 26, 2013, 11 pages.
German Office Action for German Patent Application No. DE 10 2012 100 555.9, dated Oct. 31, 2012, 5 pages.
First Office Action for Chinese Patent Application No. 201380006374.8, dated Apr. 23, 2015, 6 pages.

* cited by examiner

COVER ELEMENT

CROSS-REFERENCE TO RELATED APPLICATION

This Application is a Section 371 National Stage Application of International Application No. PCT/EP2013/051202, filed 23 Jan. 2013 and published as WO 2013/110637 A1 on 1 Aug. 2013, in German, the contents of which are hereby incorporated by reference in their entirety.

FIELD

Embodiments of invention concern a cover element for covering an opening in a horizontal surface of a drainage body.

BACKGROUND

Trench drains are constructions to be installed in the ground which receive (surface) water and dissipate it successively into the soil. Firstly such constructions must be able to absorb and dissipate water with only few barriers, and secondly they must be very stable, since great surface loads (e.g. when driven over by an HGV) must be absorbed. These loads firstly act vertically on the trench drain, and secondly not inconsiderable horizontal loads also occur when e.g. a vehicle passes by the installation site, since a force distribution in the ground also takes place in the horizontal direction (depending on material composition of the soil).

WO 2011/042415 A1 discloses a drainage body of the type cited initially. The openings in the horizontal surface of the drainage body are covered by cover elements which in their cover region have a grid-like structure of honeycomb form, which forms the supporting elements. A central longitudinal section (or a side view) of the cover element has a rectangular contour.

The known cover element uses relatively large quantities of material and has only limited load-bearing capacity.

SUMMARY

The invention is based on the object of refining a cover element of the type cited initially in that an increased load-bearing capacity is ensured with little material usage.

In particular this object is achieved by a cover element for covering an opening in an in particular horizontal surface of a drainage body with an edge region which is configured to support the cover element on the drainage body, and with a cover region having a grid-like or perforated structure with supporting elements, in that the supporting elements have a thickness which increases in the vertical direction starting from the edge region towards regions remote from the edge, such that the cover element substantially has a plano-convex outer contour in side view.

This construction surprisingly not only ensures an increased load-bearing capacity under a vertical force (acting vertically on the cover element) but also a substantially increased load-bearing capacity under load in the surface direction. At the same time, the material consumption is reduced.

It is emphasized that installation of the cover elements in base surfaces (or openings) of the drainage body also falls under the invention.

Preferably the convex region of the cover element on its underside is configured such that it protrudes into the opening. Thus forces acting both vertically and horizontally on the cover element are converted into tensile forces, against which even relatively delicate structural elements using little material are highly resistant.

The supporting elements of the grid-like structure are preferably configured as a honeycomb structure, in particular with hexagonal cells. This gives a particularly even force distribution with simultaneously high opening cross-sections for inflowing water.

Preferably on their lower edges, the supporting elements have reinforcing elements. By fitting the reinforcing elements at this location, a further substantial increase in load-bearing capacity can be achieved with relatively little material usage but nonetheless good suitability for injection molding.

The supporting elements are connected together and closed preferably in the middle of the cover elements via a horizontal plate-like component. This gives a particularly even load distribution.

Preferably several cover elements are combined into groups by means of connecting webs. This gives a simplified or accelerated assembly of the arrangement with a drainage body, wherein simultaneously precise orientation is ensured even with round covers.

Preferably the connecting webs here have bending regions such that the cover elements can be moved elastically in relation to each other in the horizontal direction. This facilitates installation even when there are certain production tolerances.

Preferably fixing elements are provided for fixing the cover element in the opening. This is particularly advantageous for transport or first assembly of the cover elements.

Preferably the cover elements are round in top view, to cover round openings. This evens out the load-bearing capacity in the horizontal direction.

Preferably the edge region can be inserted in the opening by form-fit to the drainage body in order to absorb thrust forces acting in the direction of the surface. Under the effect of a force acting in the surface direction therefore, initially no deformation of the drainage body and opening occurs before the cover absorbs the force. This also leads to an increase in the load-bearing capacity of the complete structure.

Preferably the edge regions can be inserted countersunk in the opening, whereby a further increase in load-bearing capacity of the cover element results.

A preferred embodiment of the invention is described in more detail below with reference to the figures.

DETAILED DESCRIPTION OF ILLUSTRATIVE EMBODIMENTS

Figure 1:
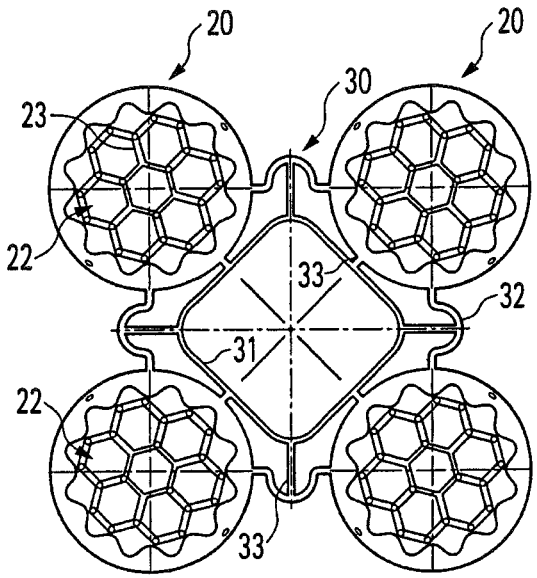
FIG. 1 a top view of a group of four cover elements,
FIG. 2 a bottom view of the arrangement in FIG. 1,
FIG. 3 a side view of the arrangement in FIGS. 1 and 2,
FIG. 4 a detail view of the extract shown in FIG. 2,
FIG. 5 a section along line V-V from FIG. 2,
FIG. 6 a section along line VI-VI from FIG. 2, (not on the drawing)
FIG. 7 a perspective view of the underside of the arrangement in FIG. 2,
FIG. 8 a perspective top view of the arrangement in FIG. 1, and
FIG. 9 a drainage body or surface unit as known from the prior art.
Figure 2:
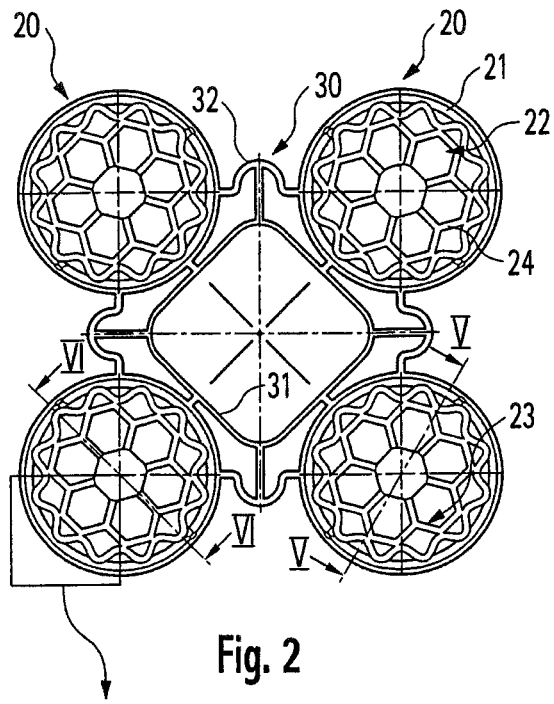
Figure 4:
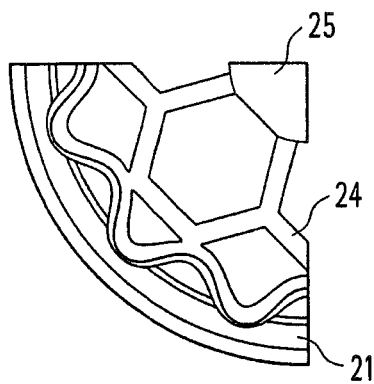
Figure 3:
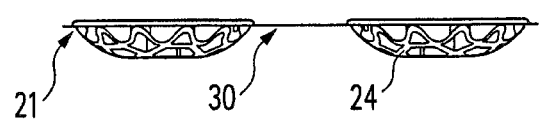
Figure 5:
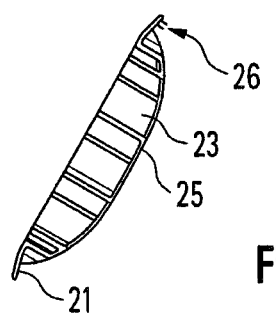
Figure 6:
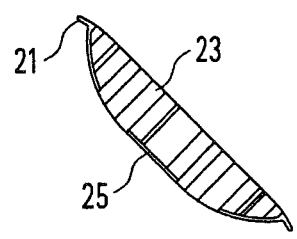

In the description below, the same reference numerals are used for the same parts and those with the same effect.

Figure 9:
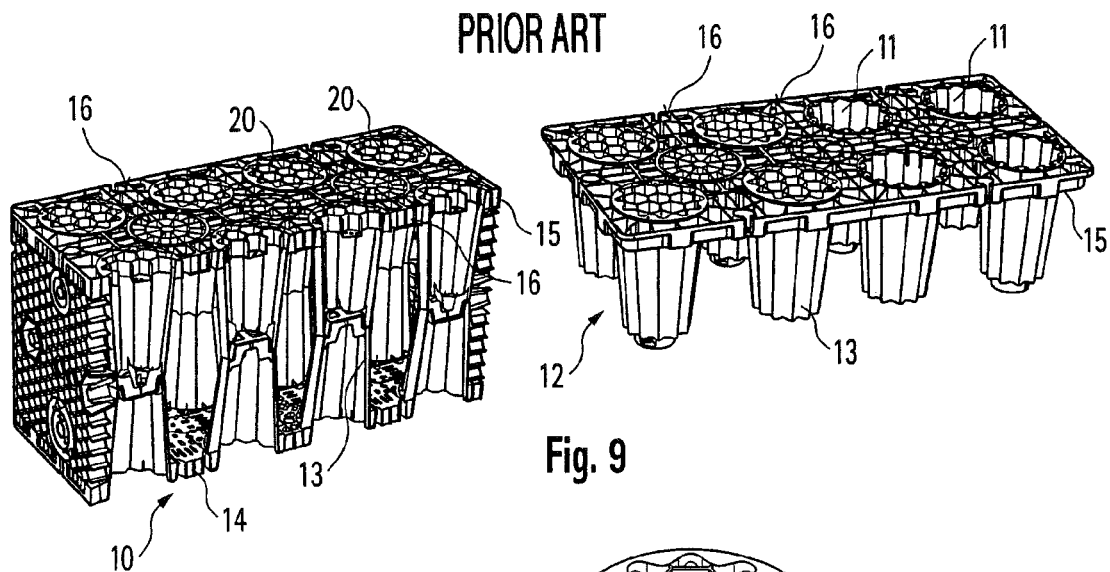

Firstly, a drainage body according to the prior art is described with reference to the enclosed FIG. 9.

A trench drain is composed of several drainage bodies 10 which each comprise a base unit 14 and a cover element 15, both constructed identically from surface units 12. Each surface unit 12 has spacer elements 13 which are configured such that a cover unit 15 can be placed firmly on a base unit 14 and mounted there. The spacer elements 13 are hollow and form openings 11 in the cover units 12 (and base units 14) which can be closed, at least in the case of cover units 15, with cover elements 20 so that soil lying above does not fall into the spacer elements 13.

The cover elements 20 according to the invention are explained in more detail below with reference to FIGS. 1 to 8.

The cover elements 20 have edge regions 21 with which they can be placed on correspondingly formed carrier edges of the drainage bodies 10 so that their surfaces run substantially level with the surface 16 of the drainage bodies 10.

The edge regions 21 surround cover regions 22 which are defined by supporting elements 23 formed as (hexagonal) honeycomb cells. These supporting elements 23—as evident in particular from FIGS. 3, 5, and 6—are thicker or higher in the middle region of the cover elements and diminish in thickness or height in the direction of the edge regions 21. In side view or in cross-section according to FIGS. 5 and 6, this gives a shape similar to a plano-convex lens, one face of which is flat and the other convex.

In the edge regions 21, the cover elements 20 are countersunk slightly downward so that the outermost edges of the cover elements 20, after insertion in an opening 11 of a drainage body 10, lie below its surface 16. To lock with the drainage body 10, fixing elements 26 are provided (see FIG. 5) which are important in particular for transport and installation. As soon as the drainage body 10 has been installed in the ground, fixing of the cover elements 20 in the drainage body 10 is no longer necessary.

The supporting elements 23 are formed strip-like and on their undersides have reinforcing elements 24, giving profiles similar to a T-girder (inverted T). In the middle, these reinforcing elements 24 run into a plate-like component 25 so as to give an extremely tension-resistant connection between the supporting elements 23 or reinforcing elements 24. The cover elements 20 constructed in this way not only have a substantial resistance against vertical load but also, because of the plano-convex construction, they also have very great resistance to forces in the surface direction (horizontal forces after installation), since buckling of the reinforcing elements is prevented because of the "bracing" and the T-shaped cross-section.

To facilitate insertion of the cover elements 20 in the openings 11 of a drainage body 10, several—in the present exemplary embodiment, four—cover elements 20 are connected together via connecting webs 30. Thus four cover elements 20 can always be installed in the openings 11 with a predefined orientation in relation to the drainage body 10.

Figure 8:
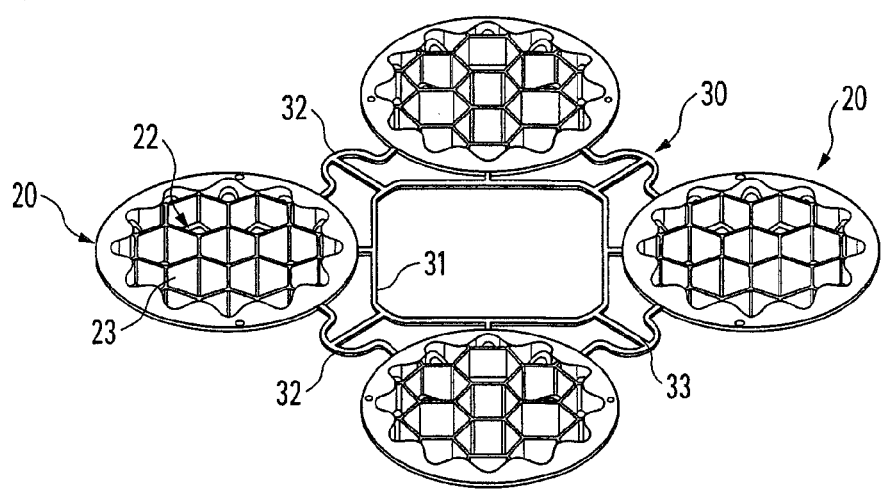
Figure 7:
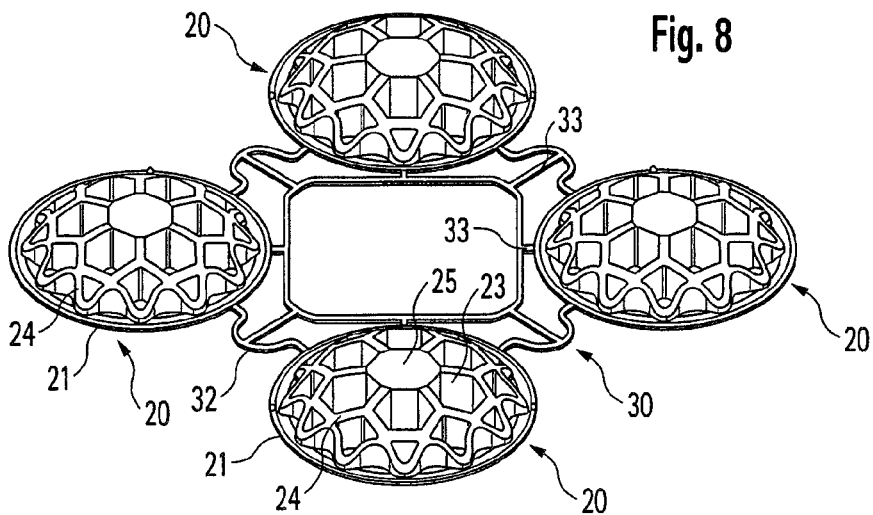

Since the cover elements 20 are produced integrally with the connecting webs 30 in the injection moulding process, and the material (preferably polypropylene) is relatively stiff to achieve an adequate strength, the connecting webs 30 are constructed such that a movement of the cover elements 20 in relation to each other in the horizontal direction is possible. This is achieved in that the connecting webs 30 have an inner frame 31 which is connected to the cover element 20 via web portions 33. Furthermore the cover elements 20 are connected together via arched webs 32 which in turn are connected to the inner frame 31 via web portions 33. If now the cover element 20 lying on the left in FIG. 8 is to be moved against the cover elements 20 lying on the right, a relatively long bending portion is available on the inner frame 31. The arched webs 32 which connect the cover element 20 lying on the left (in FIG. 8) to the cover element 20 above or below, because of their arched form shown in the figures, can deform relatively easily despite their high material stiffness so that firstly sufficient strength is achieved but secondly there is sufficient elasticity of the connecting webs 30 to compensate for tolerances.

LIST OF REFERENCE NUMERALS

10 Drainage body
11 Opening
12 Surface unit
13 Spacer element
14 Base unit
15 Cover unit
16 Surface
20 Cover element
21 Edge region
22 Cover region
23 Supporting element
24 Reinforcing element
25 Plate-like component
26 Fixing element
30 Connecting webs
31 Inner frame
32 Arched webs
33 Web portion

The invention claimed is:

1. A cover element for covering an opening in a surface of a drainage body comprising an edge region which is formed to support the cover element on the drainage body, and a cover region having a grid-like or perforated structure with supporting elements,
   wherein the supporting elements have a thickness that increases in the vertical direction starting from the edge region in the direction of the regions remote from the edge, such that the cover element has a substantially plano-convex outer contour,
   wherein several cover elements are combined into groups by means of connecting webs, and wherein the connecting webs have bending regions such that the cover elements can be moved elastically in relation to each other in the horizontal direction.

2. The cover element according to claim 1, wherein the convex region of the cover element is configured on its underside such that it protrudes into the opening.

3. The cover element according to claim 1, wherein the supporting elements of the grid-like structure are configured as a honeycomb structure.

4. The cover element according to claim 1, wherein the supporting elements have reinforcing elements on their lower edges so as to give T-shaped cross sections.

5. The cover element according to claim 1, wherein the supporting elements are connected together and closed in the middle of the cover element via a horizontal plate-like component.

6. The cover element according to claim 1, wherein fixing elements are provided for fixing the cover element in the opening.

7. The cover element according to claim 1, wherein the cover element is configured round in top view, in order to cover a round opening.

8. The cover element according to claim 1, wherein the edge region can be inserted into the opening by form fit to the drainage body in order to absorb thrust forces acting in the direction of the surface.

9. The cover element according to claim 1, wherein the edge region can be inserted countersunk in the opening.

10. The cover element according to claim 1, wherein the cover element is injection molded from plastic.

11. The cover element according to claim 10, wherein the plastic comprises polypropylene.

* * * * *